United States Patent
Hallisey et al.

(10) Patent No.: US 8,051,389 B2
(45) Date of Patent: Nov. 1, 2011

(54) METHODS OF DISPLAYING RESOURCES OF OVERLAPPING BUT SEPARATE HIERARCHIES

(75) Inventors: Brian S Hallisey, Fort Collins, CO (US); Peter M Maddocks, Windsor, CO (US); James W Wichelman, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2228 days.

(21) Appl. No.: 10/647,210

(22) Filed: Aug. 26, 2003

(65) Prior Publication Data

US 2005/0050471 A1    Mar. 3, 2005

(51) Int. Cl.
G06F 3/048    (2006.01)
G06F 3/01     (2006.01)

(52) U.S. Cl. ........ 715/853; 715/810; 715/821; 715/825; 715/854

(58) Field of Classification Search .................. 715/810, 715/815, 821, 825, 853–854
See application file for complete search history.

(56) References Cited

U.S. PATENT DOCUMENTS

| | | | | |
|---|---|---|---|---|
| 5,471,399 A * | 11/1995 | Tanaka et al. | 716/11 |
| 6,009,466 A * | 12/1999 | Axberg et al. | 709/220 |
| 6,037,939 A * | 3/2000 | Kashiwagi et al. | 715/798 |
| 6,097,393 A * | 8/2000 | Prouty et al. | 345/419 |
| 6,115,044 A * | 9/2000 | Alimpich et al. | 715/855 |
| 6,166,738 A * | 12/2000 | Robertson et al. | 715/839 |
| 6,225,999 B1 * | 5/2001 | Jain et al. | 715/734 |
| 6,253,240 B1 * | 6/2001 | Axberg et al. | 709/223 |
| 6,278,452 B1 * | 8/2001 | Huberman et al. | 715/764 |
| 6,396,516 B1 * | 5/2002 | Beatty | 715/764 |
| 6,426,761 B1 * | 7/2002 | Kanevsky et al. | 715/788 |
| 6,466,973 B2 * | 10/2002 | Jaffe | 709/223 |
| 6,670,974 B1 * | 12/2003 | McKnight et al. | 715/855 |
| 6,928,610 B2 * | 8/2005 | Brintzenhofe et al. | 715/202 |
| 6,966,033 B1 * | 11/2005 | Gasser et al. | 715/738 |
| 6,985,144 B2 * | 1/2006 | Chang | 345/423 |
| 6,996,778 B2 * | 2/2006 | Rajarajan et al. | 715/734 |
| 7,032,186 B1 * | 4/2006 | Gasser et al. | 715/853 |
| 7,039,870 B2 * | 5/2006 | Takaoka et al. | 715/736 |
| 7,046,789 B1 * | 5/2006 | Anderson et al. | 379/265.01 |
| 7,065,553 B1 * | 6/2006 | Chesley et al. | 709/205 |
| 7,107,534 B1 * | 9/2006 | de Jong et al. | 715/734 |
| 7,110,936 B2 * | 9/2006 | Hiew et al. | 703/22 |
| 7,139,973 B1 * | 11/2006 | Kirkwood et al. | 715/206 |
| 7,168,049 B2 * | 1/2007 | Day | 715/835 |
| 7,308,440 B2 * | 12/2007 | Rajarajan et al. | 707/3 |
| 7,315,985 B1 * | 1/2008 | Gauvin et al. | 715/734 |
| 7,376,898 B1 * | 5/2008 | Yehuda et al. | 715/741 |
| 2002/0186238 A1 * | 12/2002 | Sylor et al. | 345/736 |
| 2003/0033267 A1 * | 2/2003 | Bleizeffer et al. | 707/1 |
| 2003/0081013 A1 * | 5/2003 | Allen et al. | 345/853 |
| 2003/0085914 A1 * | 5/2003 | Takaoka et al. | 345/734 |
| 2003/0130821 A1 * | 7/2003 | Anslow et al. | 702/186 |
| 2003/0144996 A1 * | 7/2003 | Moore, Jr. | 707/3 |
| 2003/0184580 A1 * | 10/2003 | Kodosky et al. | 345/734 |
| 2004/0215764 A1 * | 10/2004 | Allen et al. | 709/224 |
| 2004/0243945 A1 * | 12/2004 | Benhase et al. | 715/853 |
| 2005/0055641 A1 * | 3/2005 | Machida | 715/734 |
| 2006/0080611 A1 * | 4/2006 | Chen et al. | 715/734 |

* cited by examiner

Primary Examiner — Nicholas Augustine

(57) ABSTRACT

A method of using a Graphical User Interface (GUI) to display relationships amongst resources of a system can include illustrating at least two overlapping but separate hierarchies in the same mosaic-like graphic, each hierarchy representing one or more of the relationships amongst the resources.

23 Claims, 6 Drawing Sheets

METHODS OF DISPLAYING RESOURCES OF OVERLAPPING BUT SEPARATE HIERARCHIES

BACKGROUND OF THE INVENTION

An example of a simple hierarchical relationship as depicted using the standard tree display according to the Background Art is shown in FIG. 1A.

FIG. 1A shows a parent resource 102. Child A resource 104, Child B resource 110, and Child C resource 112 are one rank below and report to the parent resource 102. Grandchild 1A resource 106 is one rank below (and reports to) the Child A resource 104 and two ranks below the Parent resource 102. Similarly, Great Grandchild 11C resource 116 is one rank below (and reports to) Grandchild 1C resource 114, two ranks below the Child C resource 112 and three ranks below the Parent resource 102.

The relationships among the resources in FIG. 1A are easily understood because the relationships are simple. Each resource only occupies a rank in one hierarchical tree.

SUMMARY OF THE INVENTION

An embodiment of the invention provides a method of using a Graphical User Interface (GUI) to illustrate relationships amongst resources of a system, the method comprising illustrating at least two overlapping but separate hierarchies in the same mosaic-like graphic, each hierarchy representing one or more of the relationships amongst the resources.

Additional features and advantages of the invention will be more fully apparent from the following detailed description of example embodiments and the accompanying drawings.

The following drawings are: intended to depict example embodiments of the invention and should not be interpreted to limit the scope thereof; and not to be considered as drawn to scale unless explicitly noted.

Figure 1A:
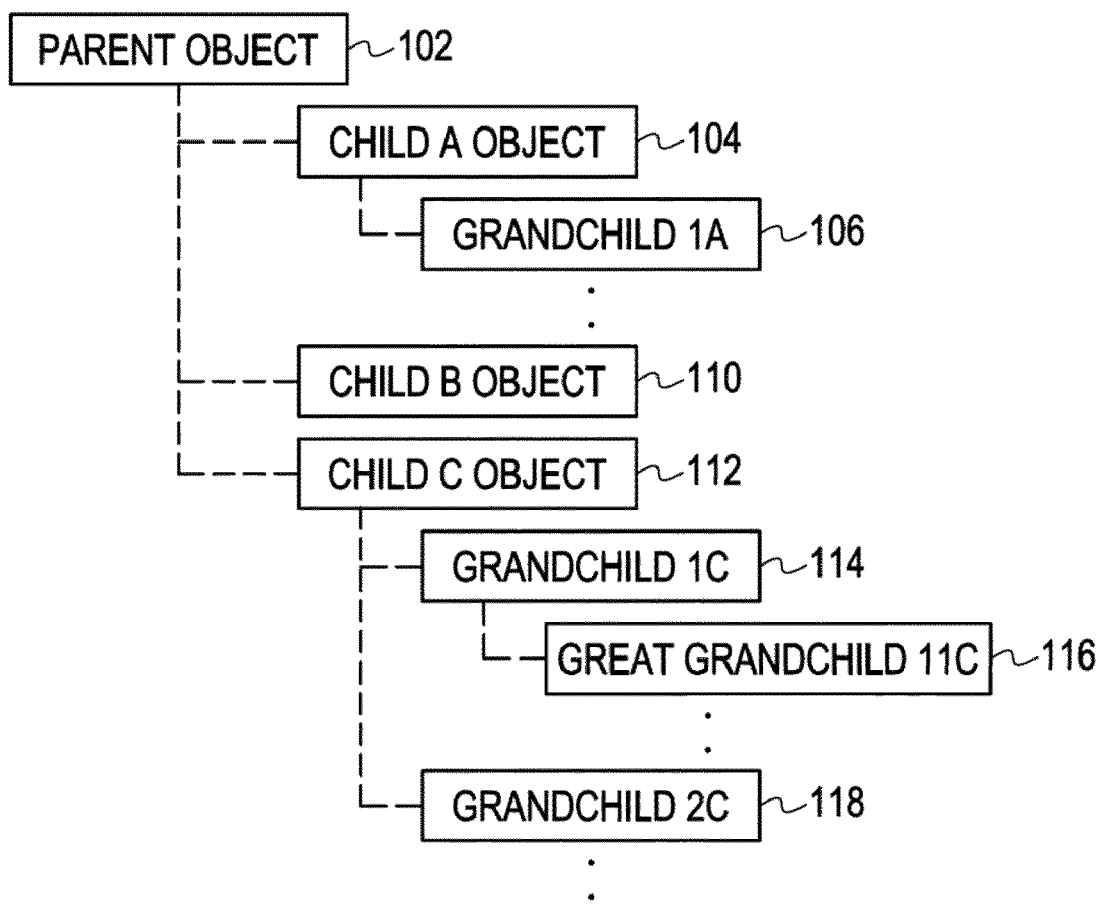
FIG. 1A is an illustrative hierarchical tree according to the Background Art.
Figure 1B:
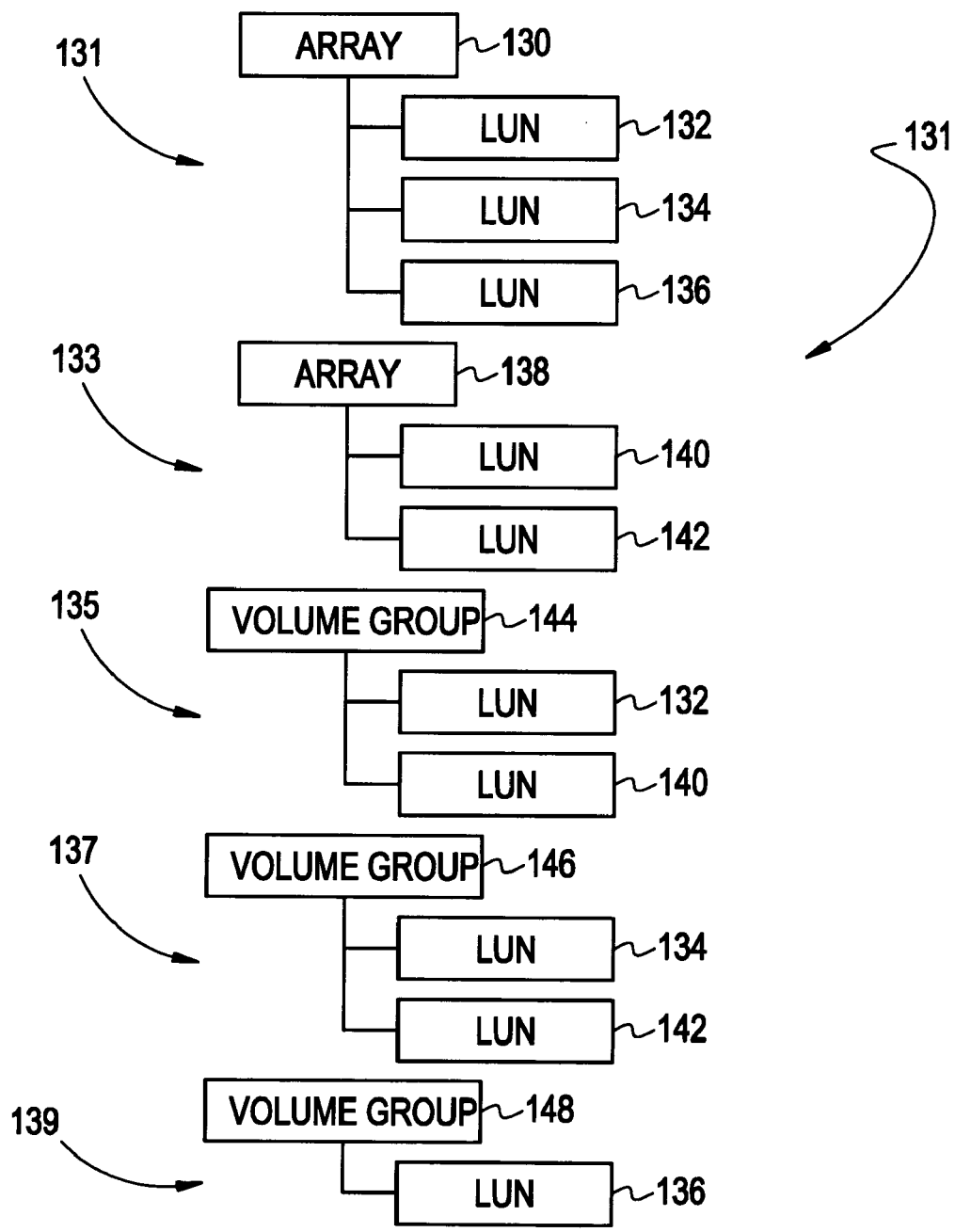
Figure 2:
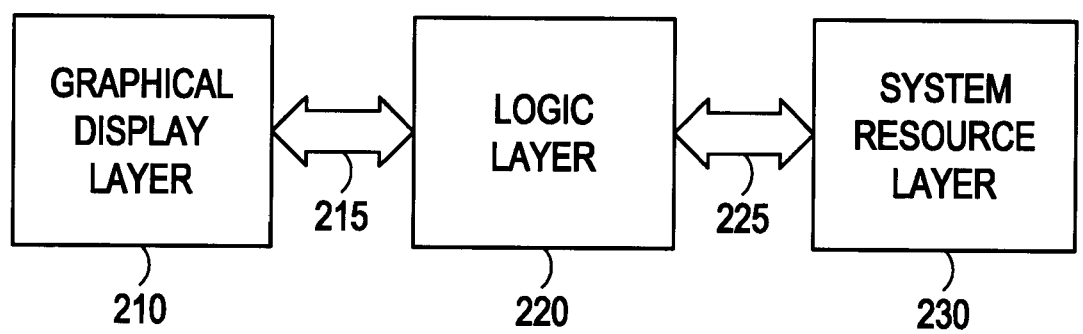
Figure 3A:
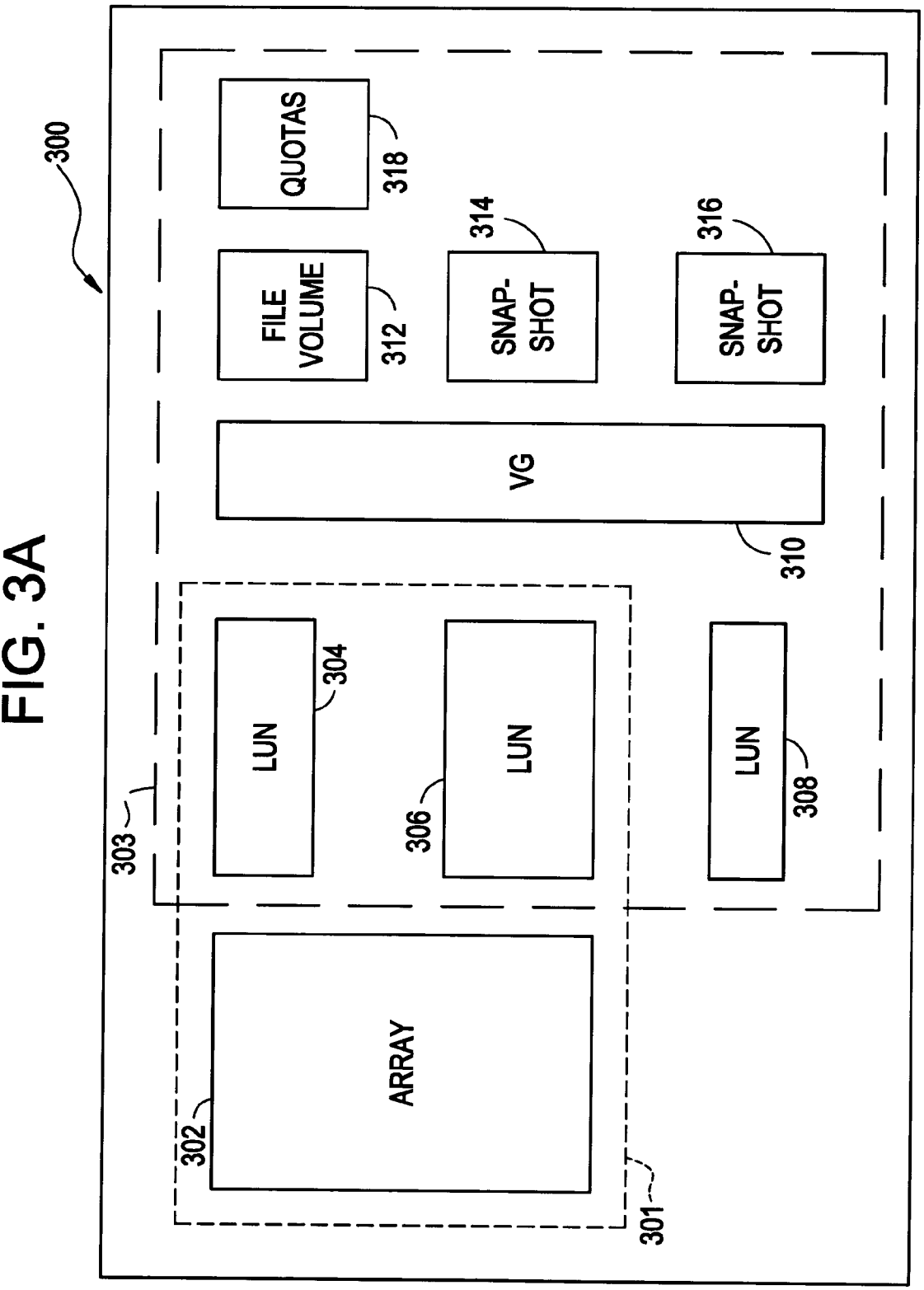
Figure 3B:
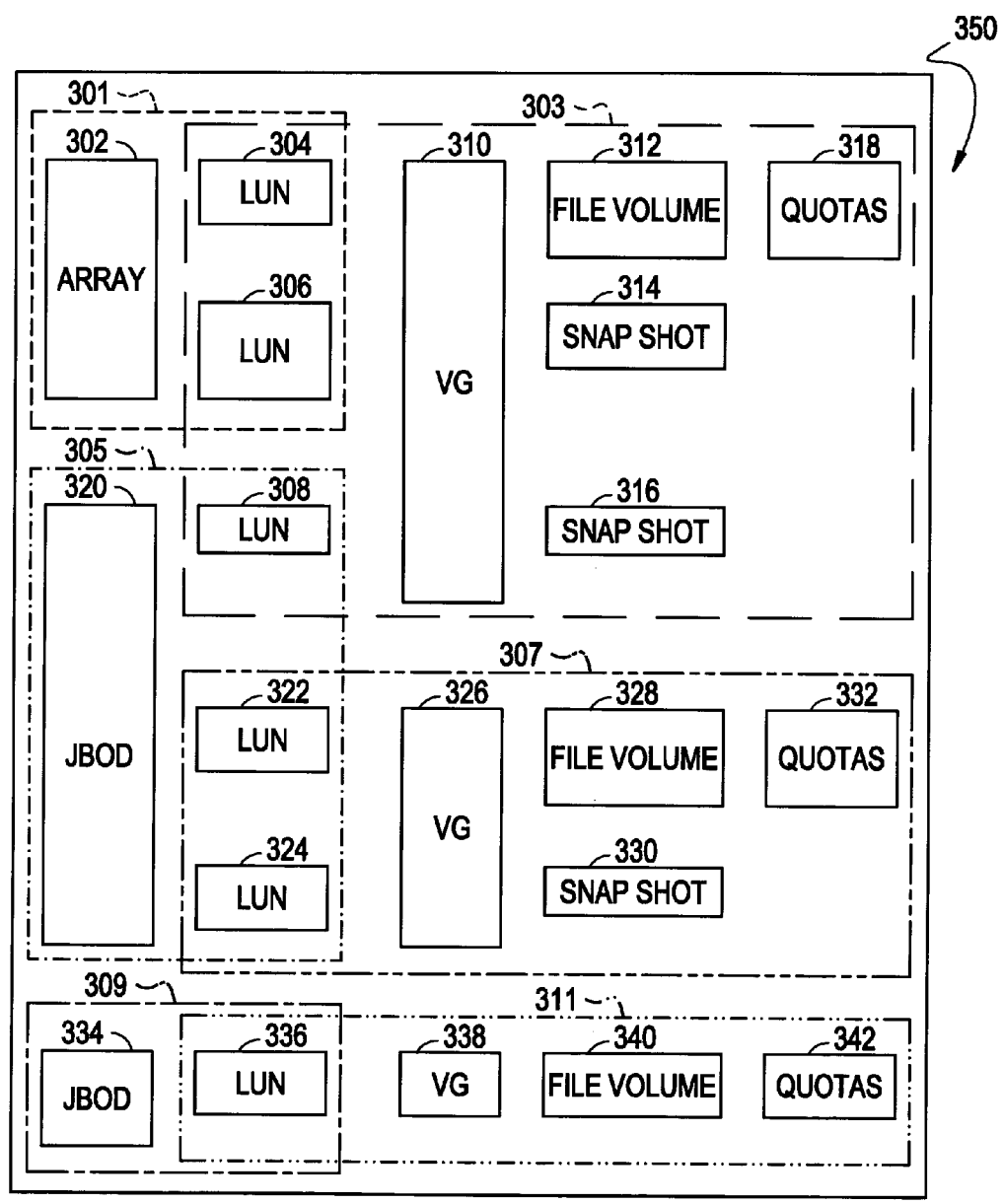
Figure 4:
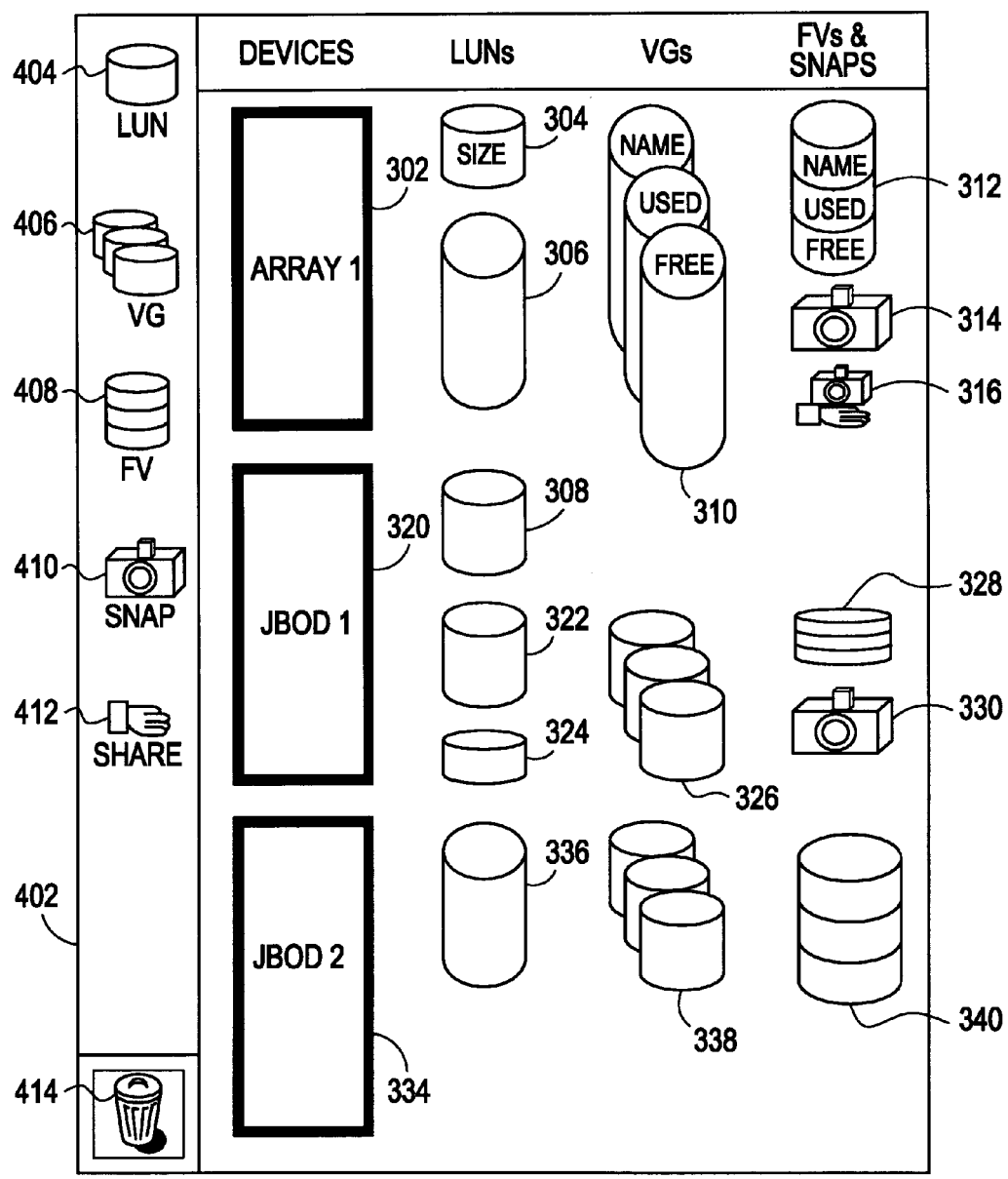

FIG. 1B is an illustrative depiction of an attempt to use a hierarchical tree format for displaying a system having resources occupying a rank in overlapping, but separate, hierarchies;

FIG. 2 is an illustrative block diagram according to an embodiment of the invention;

FIG. 3A is a view of a Graphical User Interface ("GUI") that uses a mosaic-like depiction of resource relationships according to an embodiment of the invention;

FIG. 3B is a view of a Graphical User Interface ("GUI") that uses a mosaic-like depiction of resource relationships according to an embodiment of the invention; and FIG. 4 is a view of a Graphical User Interface ("GUI") according to an embodiment of the invention that uses a 2-pane display including: a first mosaic-like pane and a second palette-like pane.

DETAILED DESCRIPTION OF THE PREFERRED EMBODIMENTS

Generally, embodiments of the invention will be discussed with reference to a NAS device, e.g., the model No. NAS 8000 made available by the HEWLETT PACKARD COMPANY (hereinafter "the known NAS"). Those skilled in the art will understand that this is not a limitation to the example embodiments of the invention, rather the NAS device is a convenient practical example of a complex system of resources.

The known NAS lets a user organize storage into the following logical divisions: Logical Unit Numbers (LUNs); Volume Groups ("VGs"); and file volumes ("FVs"). A LUN is a logical aggregation of the space on one or more physical drives. A VG is the aggregation of one or more LUNs. A VG combines the space from LUNs and make the space accessible for creating file volumes and directories, which can then be made accessible to users. A VG is divided into one or more FVs. An FV is a basic unit of logical storage on the known NAS, and can be further subdivided into individual directories. Directories contain files or other persistent data structures in a file system that contains information about other files, are usually organized hierarchically and may contain both files and other directories. Snapshots are a read-only picture of a file volume at a specific point in time that provides substantially instantaneous access to the previous snapshot version of a file.

An embodiment of the invention, in part, represents the recognition of the following. Given the number of different types of storage resources and abstractions in a NAS device (or any storage system, more generally, complex system of resources), it can be difficult to understand how one resource relates to and affects the others; in such a system, a resource may build upon other resources or may be a constituent member of another resource. A resource may have a rank in multiple hierarchies within the NAS system; how all these resources relate to compose the storage space on a NAS device (or any other storage system or complex resource system) can be quite complicated and unintuitive; known systems for displaying such hierarchies depict portions of a single hierarchy via a single display, requiring a user to toggle between different single displays to compare and contrast different hierarchies. But certain hierarchies overlap in a manner that lends itself to depicting portions of at least two overlapping but separate hierarchies via a single display.

Such recognition further includes the following. When associations between resources are complex, a simple hierarchy display quickly breaks down. An example of this is provided via FIG. 1B, which is an illustrative depiction of how a simple hierarchical tree format fails to adequately convey the overlap between hierarchies for a system having resources occupying a rank in overlapping but separate hierarchies.

The simple hierarchical tree format of FIG. 1B breaks the overlapping but separate hierarchies into a number of smaller pure parent-child hierarchies, namely trees 131, 133, 135, 137 and 139. Tree 131 has array 130 in the top rank and LUNs 132, 134 and 136 that each are one rank below and report to the array 130. Tree 133 has array 138 in the top rank and LUNs 140 and 142 that each are one rank below and report to the array 138. Tree 135 has volume group 144 in the top rank and LUNs 132 and 140 that each are one rank below and report to the volume group 144. Tree 137 has volume group 146 in the top rank and LUNs 134 and 142 that each are one rank below and report to the volume group 146. And tree 139 has volume group 148 in the top rank and LUN 136 that is one rank below and reports to the volume group 148.

It is to be observed in FIG. 1B that each of the resources (here, LUNs) are children in more than one tree. More particularly, in FIG. 1B, LUN 132 is a child of Array 130 and volume group 144; LUN 134 is a child of Array 130 and volume group 146; LUN 136 is a child of array 130 and volume group 148; LUN 140 is a child of Array 138 and volume group 144; and LUN 142 is a child of Array 138 and volume group 146.

As such, FIG. 1B shows that the use of the simple hierarchical tree format to depict complex resource relations that includes resources occupying a rank in overlapping but separate hierarchies can cause user confusion, object management issues, and can obfuscate the overall relationship between Arrays and Volume Groups. An embodiment according to the invention can eliminate such user confusion by representing separate but overlapping hierarchies in the same mosaic-like display, while still allowing for management of the individual objects.

FIG. 2 is a software block diagram according to an embodiment of the invention for iconically displaying representative relationships among system resources utilizing a logic layer intermediary. FIG. 2 includes a Graphical Display Layer 210, a Logic Layer 220, and a System Resource Layer 230. The Graphical Display Layer 210 may be a GUI operating in a web browser environment. This GUI may be adapted to display information to a user necessary to manage and manipulate the connected system resources.

The Graphical Display Layer 210 is connected by communications link 215 to a Logical Layer 220. In an embodiment of the invention, the Logical Layer 220 may utilize a software API set, an example of which is part of the operating system in the known NAS. Note, the top-level API set may utilize other API software. Commands, which may be received by the Logical Layer 220, are capable of returning a result after an API interaction with the System Resource Layer 230. Thus, the API software may be utilized to execute a user's received command and update the Graphical Display Layer 210 after execution of the command. In an embodiment of the invention, the Graphical display Layer 210 may be a GUI capable of depicting the relationships amongst resources in a system, wherein at least one of the resources occupies a rank within at least two overlapping but separate hierarchies in a mosaic-like display.

Interaction between the Logical Layer 220 and the System Resource Layer 230 may use the communications link 225. In an embodiment of the invention, the System Resource Layer 230 may be the known NAS. Thus, the software (API) of the Logic Layer 220 may process the received commands to interact with the system resource layer 230 and update the resulting changes to the Graphical Display layer 210 (possibly over communications link 215).

FIG. 3A illustrates an appearance of a Graphical User Interface ("GUI") that depicts the relationships amongst resources in a system via a mosaic-like pane 300, wherein at least one of the resources occupies a rank within at least two overlapping but separate hierarchies, according to an embodiment of the invention. In FIG. 3A, the resources are depicted in the GUI by icons 302, 304, 306, 308, 312, 314, 316 and 318. The mosaic-like pane 300 simultaneously depicts a first hierarchy denoted by phantom lines 301 and a second separate but overlapping hierarchy denoted by phantom lines 303.

The hierarchy 301 includes: an Array 302; and LUNs 304 and 306 one rank below and reporting to (also known as being children of) Array 302. The hierarchy 303 includes: VG 310; LUNs 304, 306, and 308 one rank below and reporting to the VG 310. It is to be noted that LUN 304 and LUN 306 each occupy a rank in both of the hierarchies 301 and 304.

For completeness, FIG. 3A also shows the following. In the hierarchy 303, VG 310 is also divided into File Volume 312 (a child of VG 310). In addition, the Snapshot 314 and Snapshot 316 are children of VG 310. Finally, Quotas 318 is the child of File Volume 312.

FIG. 3B illustrates an appearance of a Graphical User Interface ("GUI") that depicts the relationships amongst resources in a system via a mosaic-like pane 350, wherein numerous resources occupy a rank within at least two overlapping but separate hierarchies in a mosaic-like display, according to an embodiment of the invention. The hierarchies depicted in FIG. 3A are also depicted in FIG. 3B using like numbers. In addition, FIG. 3B simultaneously depicts separate but overlapping, respectively, hierarchies (depicted in phantom lines) 305, 307, 309 and 311.

In FIG. 3B, the hierarchy 305 includes LUNs 308, 322 and 324 one rank below and report to the JBOD 320. Hierarchies 301 and 305 are separate but overlapping. The hierarchy 307 includes: a VG 326; and LUNs 322 and 324 one rank below and report to the VG 326. Hierarchies 305 and 307 are separate but overlapping. The hierarchy 309 includes: JBOD 334 in the top rank; and LUN 336 as the child of and report to JBOD 334. The hierarchy 311 includes VG 338 in the top rank; and, LUN 336 as the child of and report to VG 338. Hierarchies 309 and 311 are separate but overlapping.

For completeness, FIG. 3B also shows the following. VG 338 is further divided into File Volume 340 (a child of VG 338). Quotas 342 is a child of File Volume 340. VG 326 is further divided into File Volume 328 (a child of VG 326); while snapshot 330 is a read-only picture of a File Volume at a specific point and a child of VG 326. Finally, Quotas 332 is a child of File Volume 328 in the hierarchy illustrated by phantom lines 307.

The relationships of the resources depicted in the mosaic-like pane 300 and 350 are apparent from (1) placement of the corresponding iconic elements in columns, respectively, and (2) the adjacent locations of various columns, respectively. Each icon is placed into its respective column based on at least one common feature of the represented resource. In an embodiment according to the invention, the icons are placed into columns according to the type of resource the icon represents. For example, rectangles 304, 306, 308, 322, 324, and 336 are all placed in a common column of the mosaic-like pane 350 because they are all icons for LUNs.

Membership in a relationship is visually conveyed by the direction in which a mosaic-like pane is viewed. For example, viewing the mosaic-like pane 300 in a first direction, e.g., from left to right, conveys that the LUNs 304 and 306 and the Array 302 are members of a relationship. An understanding that an array is typically partitioned into one more LUNs leads to the understanding of the hierarchy 301. Viewing the mosaic-like pane 300 in a second direction, e.g., from right to left, conveys that the LUNs 304, 306 and 308 and the VG 310 are members of a relationship. An understanding that a volume group is typically an aggregation of one more LUNs (possibly across multiple arrays) leads to the understanding of the hierarchy 301.

In an alternative embodiment according to the invention, the depiction of the mosaic-like pane can take into account factors such as each resource's relative rank in the overlapping but separate hierarchies, and/or each resource's type, in placing the icons into their respective columns. The columns may be labeled according to these factors.

In another embodiment according to the invention, the relative size of each icon (e.g., in terms of top-to-bottom height in FIG. 3A and FIG. 3B) can be proportional to at least one attribute of the relative resource which the icon represents. For example, the attribute represented by the size of the icons in the mosaic-like pane 300 and 350 can be the storage capacity of the resource the icon represents. As an illustrative example, it is apparent from the mosaic-like pane 300 and 350 that the size of the LUN-icon 306 represents more storage space than does LUN 304 because rectangle 306 is taller (again, in terms of top-to-bottom height) than rectangle 304.

In addition, in another embodiment of the invention, the attributes of resources (including rank, storage, size, etc.) may be changed by interacting (e.g., right-clicking to open a pop-up menu having properties and change options, etc.) with the representative icons. Upon completing the changes to the attributes of the chosen icon representing the resources, the system can automatically update the mosaic-like pane 300 and/or 350, as well as the allocation of system resources. This update can include resizing the icons according to the applicable attributes (e.g., storage capacity). In an embodiment of the invention, the footprint of (or surface area consumed by) an icon can be resized in proportion to the change in the corresponding attribute.

FIG. 4 is an embodiment according to the invention of a Graphical User Interface ("GUI") depicting a 2-pane display, including: a first or mosaic-like pane 370 (similar to mosaic-like panes 300 and 350) illustrating a system wherein at least one of the resources occupies a rank within at least two overlapping but separate hierarchies; and a second palette-like pane 402 illustrating possible system resources. Some of the icons shown in mosaic-like pane 370 are the same as those shown in the mosaic-like pane 350 (FIG. 3B); Quotas are not shown in the mosaic-like pane 370, for simplicity. The order, type and appearance of the icons in palette-like pane 402 is not a limitation in any manner.

Procedures for using the icons in the palette-like pane 402 can be as follows. According to an embodiment of the invention, a procedure for creating a LUN can include: (a) a user can select the LUN 404 icon from the palette-like pane 402, e.g., via a pointing device such as a mouse (not depicted); (b) the user can drag and drop the LUN 404 icon onto an appropriate parent object (e.g., for a LUN this could be an array or a JBOD device icon) within the mosaic-like pane 370 to cause the host system to create a new relationship within the resource system (e.g. within the NAS); (c) the host system can automatically update the mosaic-like pane 370 to reflect the changes of the system (e.g., relative sizes of footprints of the LUNs are resized according to the current allocation of resources as compared to the pre-change allocations). The host system can restrict a dragged object to being dropped only on an appropriate parent object. This can, e.g., prevent frustration in a user who drops the dragged object on an invalid location/object only to find the drag-and-drop operation has failed to further the creation of the desired resource, e.g., a LUN.

In accordance with another embodiment of the invention, an example of creating a VG (e.g. using a pointing device to interact with the icon) may include the following: (a) a user can select the VG 406 icon from the palette-like pane 402; (b) a user can drag and drop the VG 406 icon onto an appropriate parent object (e.g., for a VG this could be a LUN icon or icons) within the mosaic-like pane 370, to create a new relationship within the resource system (e.g. within the NAS); and (c) the system may automatically update the mosaic-like pane 370 to reflect the changes of the system. In addition, an existing LUN may be selected and dropped onto a VG to add additional LUNs to that VG.

Similarly, in accordance with another embodiment of the invention, an example of creating a new FV, Snapshot, or Share may include the following: (a) a user choosing the respective FV 408, Snapshot 410, or Share 412 icon from the palette-like pane 402; (b) a user dragging and dropping the appropriate icon onto an appropriate parent object (e.g., for a FV this could be a VG icon, for a Snapshot or Share this could be a FV icon) within the mosaic-like pane 370; (c) a user providing the attributes for that resource; and (d) the system updating the system and appropriate attributes. One of ordinary skill will appreciate that the system can have appropriate safeguards to prevent the creation of inappropriate/illegal resource relationships.

In accordance with another embodiment of the invention, the validity of some or all operations of adding (as mentioned above), deleting, and creation of new relationships amongst the system resources may be validated prior to processing. If the operation is deemed invalid, the system may refuse to process the command. In addition, the system may issue a system warning.

Finally, system resource relationships may be created and/or deleted among existing system resources using direct interaction procedures that may not involve palette-like pane 402. An example procedure to change the attributes of resources from the system can include the following: (a) a user selecting an icon depicted in the mosaic-like pane 370 (e.g., by clicking an indicator peripheral device on that icon); (b) the attributes of the selected icon being changed (e.g. by entering data into a pop-up window), which may change the attributes of the resource associated with the selected icon and change the relationships of other system resources; and (c) the system automatically updating the system resource relationships and the mosaic-like pane 370.

Just as relationships may be created amongst system resources by adding resources to the system, in an embodiment of the invention, new relationships may be created by deleting/removing existing system resources. An example procedure to delete resources from the system can include the following: (a) a user selecting an associated icon from the mosaic-like pane 370; (b) a user drag-and-dropping a system resource to the trashcan 414 in the palette-like pane 402; and (c) the system automatically updating the system resource relationships and the mosaic-like pane 370. Alternative manners of deletion may include, for example, drop-down menus which include the delete option for the selected icon associated with a system resource.

The example orientations of the icons in the mosaic-like panes are not a limitation.

The invention may be embodied in other forms without departing from its spirit and essential characteristics. The described embodiments are to be considered only non-limiting examples of the invention.

What is claimed is:

1. A method of using a Graphical User Interface (GUI) to display relationships amongst resources of a system, the method comprising:

illustrating at least two overlapping but separate hierarchies in a same mosaic-like graphic, each of said separate hierarchies representing one or more of the relationships amongst the resources; and arranging said resources representing same type of resources into columns, wherein adjacent columns group different resources, and a row intersecting adjacent columns indicates relationships between particular resources of the respective column, wherein the mosaic-like graphic depicts a logical unit number (LUN) occupying a rank in both of the two overlapping but separate hierarchies.

2. The method of claim 1, wherein said resources are represented by icons and, further comprising:

sizing said icons in proportion to said at least one attribute of said represented resource.

3. The method of claim 1, wherein said LUN is a child in separate hierarchical trees.

4. The method of claim 2, further comprising:

labeling one hierarchical columns and one hierarchical rows with an indication of at least one common feature.

5. The method of claim 2, further comprising:
interacting with at least one said icon of said mosaic-like graphic, wherein said interaction results in a change in said at least one attribute of said represented resource; and
in response to said interaction, restructuring a first mosaic-like pane by at least
re-sizing said icons proportional to a change in said at least one attribute of said represented resources, compared to a footprint of said at least one attribute prior to said interaction.

6. The method of claim 1, wherein said LUN reports to a volume group (VG) in one storage resources and a just a bunch of disks (JBOD) in another storage resource.

7. The method of claim 1 further comprising:
simultaneously displaying in the mosaic-like graphic icons of LUNs in one column, icons of volume groups (VGs) in a second column, and icons of file volumes (FVs) in a third column.

8. The method of claim 1, wherein arrays, LUNs, and volume groups are simultaneously displayed in separate columns.

9. The method of claim 2, wherein the mosaic-like graphic is a first mosaic-like graphic, the method further comprising illustrating a first mosaic-like pane and a second mosaic-like pane containing independent icons representative of resources that may be added to said at least two overlapping but separate hierarchies, comprising:
receiving an indication of a new relationship developed between a resource of a type represented in said second mosaic-like pane and the resources represented in said first mosaic-like pane; and
restructuring, in response to receiving said indication, said at least two overlapping but separate hierarchies and corresponding said first mosaic-like pane by at least re-sizing said icons proportional to a change in said at least one attribute of said represented resources, compared to a footprint of said at least one attribute prior to receiving said indication.

10. The method of claim 9, wherein said receiving an indication step, comprises:
processing a drag-and-drop of at least one said independent icon from said second mosaic-like pane to said first mosaic-like pane.

11. The method of claim 10, further comprising:
rejecting said processing of an invalid said drag-and-drop.

12. The method of claim 10, further comprising:
in response to said processing step, displaying a pop-up window for receiving changes to said attributes.

13. A method of controlling relationships amongst resources of a system, wherein said resources are iconically represented and illustrated on a Graphical User Interface (GUI), comprising:
manipulating a relationship of the resources in said iconically illustrated system;
re-sizing, in response to said manipulating, a surface area consumed on the GUI by said icons in proportion to a change upon respective ones of the resources caused by the manipulating the relationship, wherein the relationships of the resources are shown in a hierarchical tree from placement of icons in columns with resources of a same type being in a same column and a resource is shown as being a child to separate hierarchical trees that depict storage resources, and wherein the surface area of the icons are resized according to current allocation of storage resources; and
illustrating at least two overlapping but separate hierarchies in a same mosaic-like graphic, each of said separate hierarchies representing one or more of the relationships amongst the resources.

14. The method of claim 13, wherein said manipulating step comprises:
interacting with at least one icon, representative of one said resource in said iconically illustrated system to initiate a change of at least one attribute of said represented resource.

15. The method of claim 14, wherein said initiating step comprises:
displaying, in response to said interaction step, attributes of said represented resource, wherein said attributes are changeable; and
indicating changes to said at least one attribute through the operation of at least one peripheral device.

16. The method of claim 13, wherein the surface area of the icons are resized according to storage capacity.

17. A method of displaying relationships amongst first, second and third types of resources of a system, the method comprising:
preparing a graphic of at least two separate but overlapping hierarchies such that
viewing the graphic in a first direction represents a first one of said separate but overlapping hierarchies in which ones of the first resource type report hierarchically to ones of the second resource type, and
viewing the graphic in a second direction different from the first direction represents a second one of said separate but overlapping hierarchies in which ones of the first resource type report hierarchically to ones of the third resource type; and
displaying the graphic, wherein the graphic is mosaic-like.

18. The method of claim 17, wherein each of the first, second and third resources is represented as an iconic element of the mosaic-like graphic that includes logical unit numbers (LUNs), arrays, and volume groups.

19. The method of claim 17, wherein
the first one of said separate but overlapping hierarchies represents physical storage resources of a storage system, and
the second one of said separate but overlapping hierarchies represents logical storage resources of the storage system.

20. The method of claim 17, wherein the second direction is opposite to the first direction.

21. The method of claim 17, wherein said first, second and third types of resources are represented by icons, further comprising:
sizing said icons in proportion to at least one attribute of said represented resource.

22. The method of claim 21, wherein said at least one attribute is storage capacity.

23. The method of claim 21, further comprising:
arranging said icons representing same type of resources into columns, wherein adjacent columns group different resources, and a row intersecting adjacent columns indicate relationships between particular resources of the respective column.

* * * * *

UNITED STATES PATENT AND TRADEMARK OFFICE
CERTIFICATE OF CORRECTION

PATENT NO. : 8,051,389 B2  
APPLICATION NO. : 10/647210  
DATED : November 1, 2011  
INVENTOR(S) : Brian S Hallisey et al.

Page 1 of 1

It is certified that error appears in the above-identified patent and that said Letters Patent is hereby corrected as shown below:

In column 6, line 66, in Claim 4, delete "columns" and insert -- column --, therefor.

In column 6, line 67, in Claim 4, delete "rows" and insert -- row --, therefor.

Signed and Sealed this  
Tenth Day of July, 2012

David J. Kappos  
*Director of the United States Patent and Trademark Office*